(12) United States Patent
Jang

(10) Patent No.: US 12,370,992 B2
(45) Date of Patent: Jul. 29, 2025

(54) ELECTRO-MECHANICAL BRAKE SYSTEM AND CONTROLLING METHOD THEREOF

(71) Applicant: HL MANDO CORPORATION, Pyeongtaek-si (KR)

(72) Inventor: Jaehoon Jang, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 167 days.

(21) Appl. No.: 18/235,438

(22) Filed: Aug. 18, 2023

(65) Prior Publication Data

US 2024/0239322 A1 Jul. 18, 2024

(30) Foreign Application Priority Data

Jan. 18, 2023 (KR) .................. 10-2023-0007583

(51) Int. Cl.
*B60T 13/74* (2006.01)
*B60T 17/22* (2006.01)

(52) U.S. Cl.
CPC .......... *B60T 13/741* (2013.01); *B60T 17/221* (2013.01)

(58) Field of Classification Search
CPC ...... B60T 13/741; B60T 17/221; B60T 17/22; B60T 8/171; B60T 8/172; B60T 8/173; F16D 2066/003; F16D 2066/005; F16D 55/226; F16D 2121/24; F16D 65/183; B60Y 2400/81
See application file for complete search history.

(56) References Cited

U.S. PATENT DOCUMENTS

| | | | | |
|---|---|---|---|---|
| 6,464,308 B2* | 10/2002 | Kubota | ................ | B60T 13/741 303/3 |
| 7,475,760 B2* | 1/2009 | Longuemare | ......... | B60T 13/741 188/1.11 R |
| 2005/0194836 A1* | 9/2005 | Simpson | ............... | B60T 13/746 188/1.11 E |
| 2007/0068237 A1* | 3/2007 | Zumberge | ............... | F16D 66/02 73/121 |
| 2020/0284311 A1* | 9/2020 | Henning | ............... | F16D 66/023 |
| 2025/0074371 A1* | 3/2025 | Lim | ........................ | F16D 66/00 |

FOREIGN PATENT DOCUMENTS

| | | |
|---|---|---|
| JP | 2000-46082 A | 2/2000 |
| JP | 6119956 B2 | 4/2017 |
| KR | 10-1220294 B1 | 1/2013 |

* cited by examiner

*Primary Examiner* — Sizo B Vilakazi
(74) *Attorney, Agent, or Firm* — Hauptman Ham, LLP (57) ABSTRACT

Disclosed herein are an electro-mechanical brake system and a controlling method thereof. The electro-mechanical brake system according to the present embodiment includes a driving part including a motor configured to generate a driving force and a brake pad configured to brake a vehicle or release braking by moving forward and backward with respect to a disc by the motor, a sensor part including a first sensor configured to output a signal corresponding to a stroke of the motor, a second sensor configured to output a signal corresponding to a force applied from the disc to the brake pad, and a third sensor configured to output a signal corresponding to an active brake condition of the vehicle, a controller configured to estimate and update a contact point between the disc and the brake pad, whenever a braking input of the brake pad or release thereof occurs.

20 Claims, 6 Drawing Sheets

ELECTRO-MECHANICAL BRAKE SYSTEM AND CONTROLLING METHOD THEREOF

CROSS-REFERENCE TO RELATED APPLICATION

This application claims the benefit of Korean Patent Application No. 10-2023-0007583, filed on Jan. 18, 2023 in the Korean Intellectual Property Office, the disclosure of which is incorporated herein by reference.

BACKGROUND

1. Field

Embodiments of the present disclosure relate to an electro-mechanical brake system and a controlling method thereof, and more particularly, to an electro-mechanical brake system capable of preventing a drag phenomenon and also improving braking response performance and a controlling method thereof.

2. Description of the Related Art

A brake system for performing braking is essentially installed in a vehicle, and various types of brake systems have been proposed for the safety of drivers and passengers.

In a conventional brake system, a method of supplying a hydraulic pressure required for braking to wheel cylinders using a mechanically connected booster when a driver steps on a brake pedal has been mainly used.

However, recently, an electro-mechanical brake (EMB), which receives a driver's intention to brake as an electric signal and provides a braking force of a vehicle by operating an electrical device such as a motor based on the electric signal, has been developed as a next-generation brake system and widely used.

There are advantages in that a braking distance is relatively short so that the driver's safety is significantly improved as the electro-mechanical brake system does not require a time for a hydraulic pressure to be transferred and enables optimal control of the braking force of the vehicle, and a brake pedal becomes very easy to use and vehicle shudder or braking noise is not generated due to electronic braking.

However, in the electro-mechanical brake system, a drag phenomenon occurs in which friction occurs between a disc and a brake pad even during non-braking because return of the brake pad by a return spring and the like is not completely made after a braking force is generated by a friction force generated by contact between the disc and the brake pad.

As the drag phenomenon causes unnecessary friction between the disc and the brake pad, there are problems such as a loss of engine output that lowers fuel efficiency, generation of a judder, that is, an abnormal vibration, which degrade interior quietness and ride comfort, reduction in the life of the brake pad, and the like.

Meanwhile, when a sufficient gap between the brake pad and the disc is secured to prevent the drag phenomenon, there is a problem that braking response performance is degraded because a dead stroke increases during braking in a similar situation.

SUMMARY

Therefore, it is an aspect of the present disclosure to provide an electro-mechanical brake system capable of achieving zero drag by preventing a drag phenomenon caused by a distance between a brake pad and a disc and a controlling method thereof.

It is another aspect of the present disclosure to provide an electro-mechanical brake system capable of preventing a drag phenomenon caused by abrasion of a brake pad and the like and response performance degradation of a brake and a controlling method thereof.

It is still another aspect of the present disclosure to provide an electro-mechanical brake system capable of preventing response performance degradation of a brake by adjusting a distance between a disc and a brake pad when an active brake condition occurs and a controlling method thereof.

It is yet another aspect of the present disclosure to provide an electro-mechanical brake system capable of preventing side effects such as temperature rise of a disc, occurrence of a drag phenomenon, reduction in the life of a brake pad, and the like caused by a distance between the disc and the brake pad, which is adjusted when an active brake condition occurs, and a controlling method thereof.

Additional aspects of the disclosure will be set forth in part in the description which follows and, in part, will be obvious from the description, or may be learned by practice of the disclosure.

In accordance with one aspect of the present disclosure, an electro-mechanical brake system includes a driving part including a motor configured to generate a driving force and a brake pad configured to brake a vehicle or release braking by moving forward and backward with respect to a disc by the motor, a sensor part including a first sensor for measuring a stroke of the motor, a second sensor for measuring or estimating a force applied from the disc to the brake pad, and a third sensor for detecting an active brake condition of the vehicle, and a controller configured to estimate and update a contact point between the disc and the brake pad whenever a braking input or release thereof occurs and adjust a distance between the disc and the brake pad based on the contact point according to information measured and detected by the sensor part.

The controller may estimate a time when the force starts to increase according to the stroke of the motor by the braking input or a time when the force becomes zero according to the stroke of the motor by the release of the braking input as the contact point.

The controller may move the brake pad by a preset first stroke based on the contact point when power is applied to the motor or the braking input is released, and the first stroke may be set to a shortest distance in which a drag phenomenon between the brake pad and the disc does not occur.

The controller may move the brake pad by a preset second stroke based on the contact point when the active brake condition of the vehicle occurs, and the second stroke may be set to a shorter distance than the first stroke from the contact point.

The controller may move the brake pad by the first stroke when the braking input is released in a state in which the brake pad has been moved by the second stroke.

The controller may move the brake pad the first stroke when there is no braking input for a preset time in a state in which the brake pad has been moved by the second stroke.

The stroke of the motor may be defined as a travel distance of the brake pad according to driving of the motor.

The braking input and the release of the braking input may be provided by a driver's operation of a brake pedal.

Meanwhile, in accordance with another aspect of the present disclosure, an electro-mechanical brake system includes a driving part including a motor configured to generate a driving force and a brake pad configured to brake a vehicle or release braking by moving forward and backward with respect to a disc by the motor and a controller configured to adjust a distance between the disc and the brake pad through driving of the motor, and the controller estimates and updates a contact point between the disc and the brake pad whenever a braking input or release thereof occurs, moves the brake pad by a preset first stroke from the disc based on the contact point when power is applied to the motor or the braking input is released, and moves the brake pad by a preset second stroke from the disc based on the contact point when an active brake condition of the vehicle occurs.

The controller may estimate a time when a force starts to increase according to a stroke of the motor by the braking input or a time when the force becomes zero according to the stroke of the motor by the release of the braking input as the contact point.

The first stroke may be set to a shortest distance in which a drag phenomenon between the brake pad and the disc does not occur.

The second stroke may be set to a shorter distance than the first stroke from the contact point.

The controller may move the brake pad, which has been moved by the second stroke from the disc based on the contact point, by the first stroke based on the contact point, when the braking input is released.

The controller may move the brake pad, which has been moved by the second stroke from the disc based on the contact point, by the first stroke based on the contact point when there is no braking input for a preset time.

The stroke of the motor may be defined as a travel distance of the brake pad according to driving of the motor.

The braking input and the release of the braking input may be provided by a driver's operation of a brake pedal.

Meanwhile, in accordance with still another aspect of the present disclosure, a controlling method of an electro-mechanical brake system including a driving part provided with a motor configured to generate a driving force and a brake pad configured to brake a vehicle or release braking by moving forward and backward with respect to a disc by the motor includes estimating and updating a time when a force starts to increase according to a stroke of the motor by a braking input provided by a driver's operation of a brake pedal or a time when the force becomes zero according to the stroke of the motor by release of the braking input as a contact point and moving the brake pad by a preset first stroke or a preset second stroke based on the contact point.

The first stroke may be set to a shortest distance in which a drag phenomenon between the brake pad and the disc does not occur, and the second stroke may be set to a shorter distance than the first stroke from the contact point.

The moving of the brake pad by the preset first stroke or the preset second stroke based on the contact point may include moving the brake pad by the first stroke based on the contact point when power is applied to the motor or the braking input is released, and moving the brake pad by the second stroke based on the contact point when an active brake condition of the vehicle is detected.

The controlling method may further include moving the brake pad, which has been moved by the second stroke based on the contact point, by the first stroke based on the contact point when the braking input is released or there is no braking input for a preset time.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings may omit the illustration of parts not related to the description in order to clarify the present disclosure, and slightly exaggerate the size of the components to help understanding.

Figure 1:
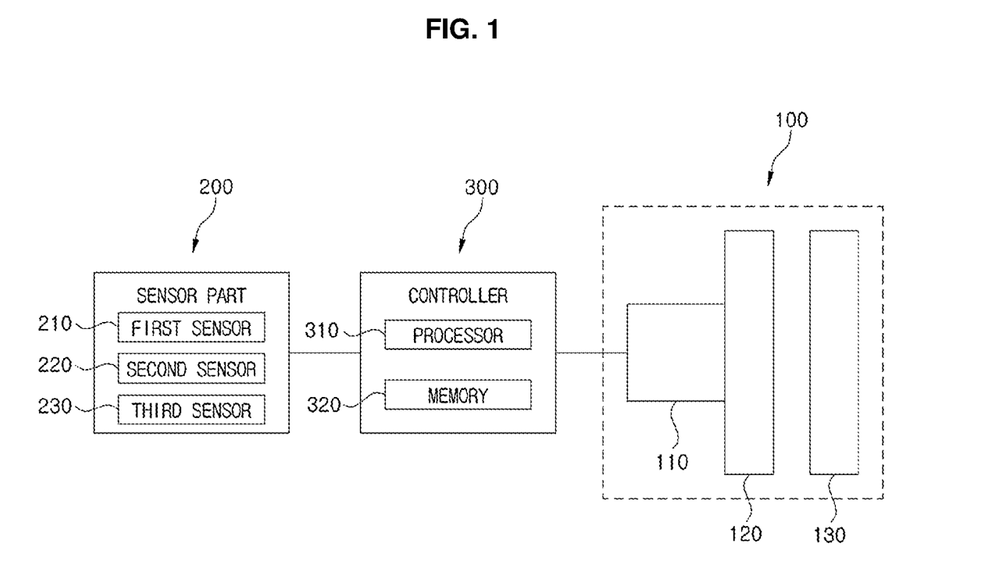
FIG. 1 is a schematic diagram of an electro-mechanical brake system according to one embodiment of the present disclosure.
Figure 2:
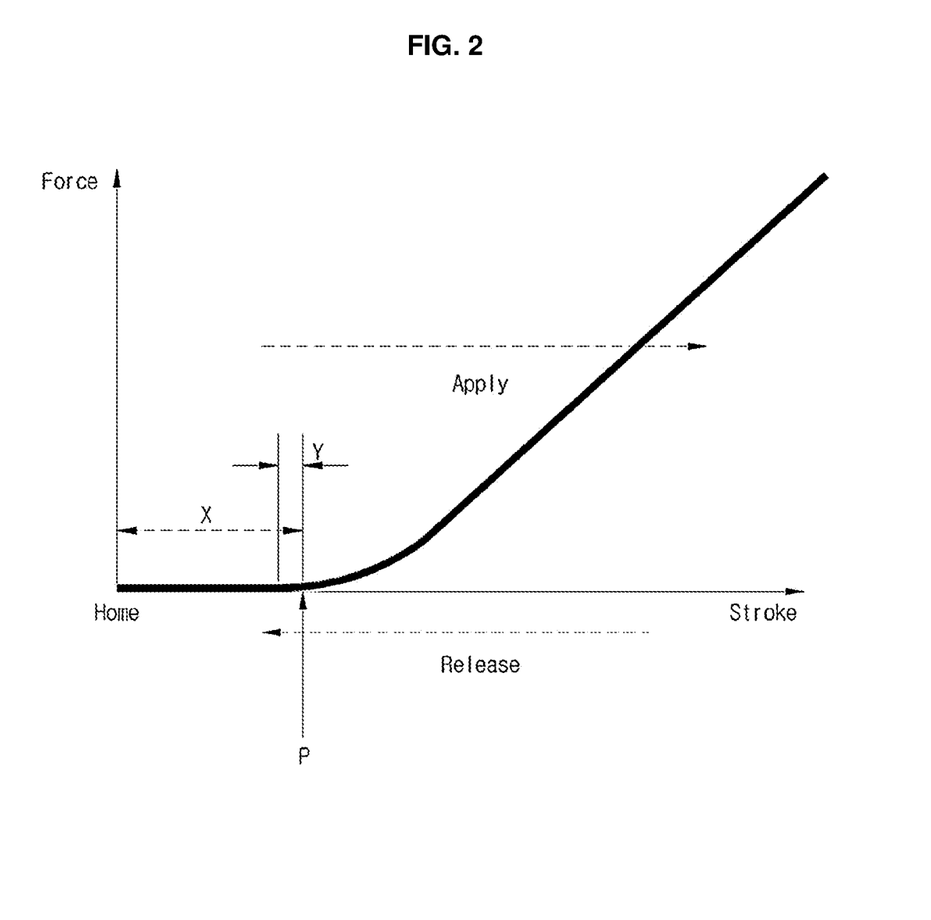
FIG. 2 is a graph illustrating a relation between a stroke of a motor and a force in the electro-mechanical brake system according to one embodiment of the present disclosure.
Figure 3:
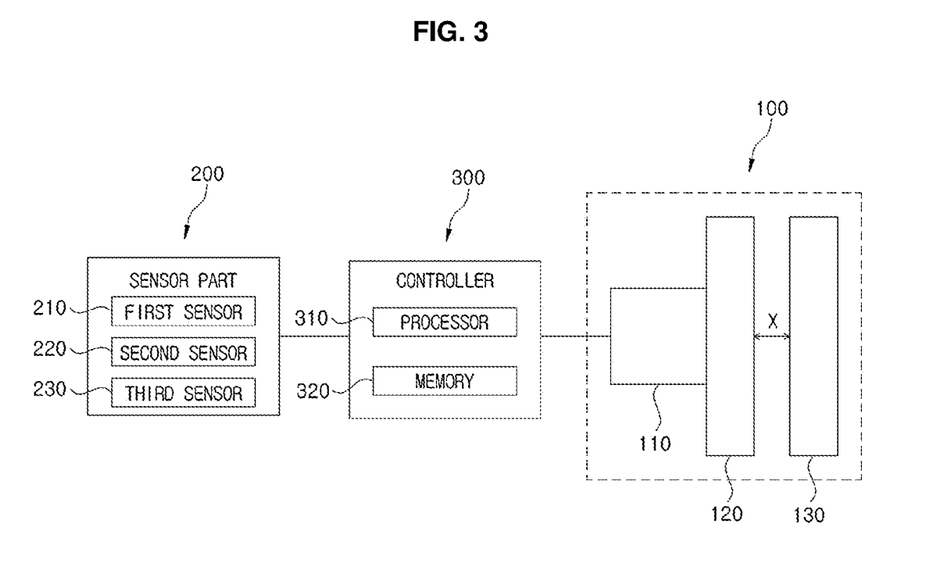
FIG. 3 is a schematic diagram illustrating when power is applied to the motor or a braking input is released in the electro-mechanical brake system according to one embodiment of the present disclosure.
Figure 4:
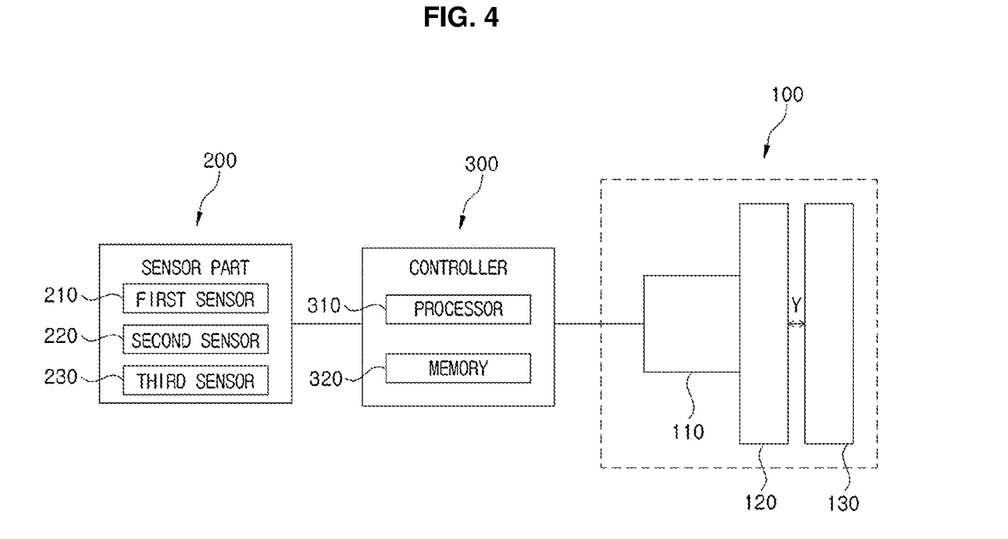
FIG. 4 is a schematic diagram illustrating when an active brake condition is detected in the electro-mechanical brake system according to one embodiment of the present disclosure.

FIG. 1 is a schematic diagram of an electro-mechanical brake system according to one embodiment of the present disclosure. In addition, FIG. 2 is a graph illustrating a relation between a stroke of a motor and a force in the electro-mechanical brake system according to one embodiment of the present disclosure. In addition, FIGS. 3 and 4 are a schematic diagram illustrating when power is applied to the motor or when a braking input is released and a schematic diagram illustrating when an active brake condition is detected, respectively, in the electro-mechanical brake system according to one embodiment of the present disclosure.

Referring to FIGS. 1 to 4, the electro-mechanical brake system according to one embodiment of the present disclosure includes a driving part 100, a sensor part 200, and a controller 300.

More specifically, the driving part 100 includes a motor 110 configured to generate a driving force and a brake pad 120 configured to brake a vehicle or release braking by moving forward and backward with respect to a disc 130 by the motor 110. In addition, the driving part 100 may include a spindle, a spindle nut, and the like for converting a rotational motion of the motor 110 into a linear motion.

The sensor part 200 includes a first sensor 210 configured to output a signal corresponding to a stroke of the motor 110, a second sensor 220 configured to output a signal corresponding to a force applied from the disc 130 to the brake pad 120, and a third sensor 230 configured to output a signal corresponding to an active brake condition of the vehicle.

More specifically, the first sensor 210 may be a motor position sensor. In addition, the second sensor 220 may be a load sensor that estimates a force applied from the disc 130 to the brake pad 120 through a current applied to the motor 110 or directly measures the force applied from the disc 130 to the brake pad 120 by being provided on a side of the brake pad 120 or the disc 130. In addition, the third sensor 230 may be at least one or more radar sensors or ultrasonic sensors detecting not only a state of the vehicle but also a front side, a lateral side, a rear side, and the like of the vehicle.

Herein, the active brake condition means the occurrence of an emergency situation such as a drastic reduction in distance from a vehicle ahead, sudden appearance of an obstacle, and the like in adaptive cruise control or smart cruise control, operation of an anti-lock brake system (ABS), and the like, which may be detected by various known methods.

The controller 300 may include a processor 310 and a memory 320.

The processor 310 may control an overall operation of the electro-mechanical brake system according to one embodiment of the present disclosure.

The memory 320 may store a program for processing or controlling the processor 310 and various data for operating the electro-mechanical brake system according to one embodiment of the present disclosure.

As an example, the memory 320 may include not only volatile memories such as an S-RAM and a D-RAM but also non-volatile memories such as a flash memory, a read only memory (ROM), and an erasable programmable read only memory (EPROM).

More specifically, the controller 300 estimates and updates a contact point P between the disc 130 and the brake pad 120, whenever a braking input or release of the braking input occurs, and adjusts a distance between the disc 130 and the brake pad 120 based on the contact point P according to information measured and detected by the sensor part 200. Herein, as illustrated in FIG. 2, the controller 300 may estimate a time when the force starts to increase according to a stroke of the motor 110 by the braking input (Apply) or a time when the force becomes zero according to the stroke of the motor 110 by the release of the braking input as the contact point P.

Herein, the braking input and the release of the braking input may be provided by a driver's operation of a brake pedal (not shown). To this end, the sensor part 200 may further include a sensor configured to detect an operation of the brake pedal.

In addition, the stroke of the motor 110 may be defined as a travel distance of the brake pad 120 according to driving of the motor 110 and measured by the first sensor 210. In addition, the force may be measured by the second sensor 220.

Meanwhile, as illustrated in FIGS. 2 and 3, when power is applied to the motor 110 or the braking input is released, the controller 300 moves the brake pad 120 by a preset first stroke X based on the contact point P. Herein, the first stroke X may be set to a shortest distance in which a drag phenomenon between the brake pad 120 and the disc 130 does not occur, and a value obtained by subtracting the first stroke X from the contact point P may be defined as a reference state (Home).

Accordingly, the electro-mechanical brake system according to one embodiment of the present disclosure may achieve zero drag by preventing a drag phenomenon caused by a distance between a brake pad and a disc.

In addition, in the electro-mechanical brake system according to one embodiment of the present disclosure, as the controller 300 updates the contact point P in real time when a braking input or release of the braking input occurs, a constant distance between the brake pad 120 and the disc 130 may be maintained even when abrasion of the brake pad 120 or the like occurs, so that a drag phenomenon and degradation of brake response performance may be prevented.

Meanwhile, as illustrated in FIGS. 2 and 4, when an active brake condition of the vehicle occurs, the controller 300 moves the brake pad 120 by a preset second stroke Y based on the contact point P. Herein the second stroke Y is set to a shorter distance than the first stroke X from the contact point P.

Accordingly, the electro-mechanical brake system according to one embodiment of the present disclosure may prevent response performance degradation of a brake through adjustment of a distance between a disc and a brake pad when the active brake condition occurs.

In addition, in a state where the brake pad 120 has been moved by the second stroke Y, when the braking input is released or the rotation of the disc 130 is stopped by the brake pad 120, the controller 300 may move the brake pad 120 by the first stroke X. In addition, in a state where the brake pad 120 has been moved by the second stroke Y, when there is no braking input for a preset time, the controller 300 may move the brake pad 120 the first stroke X.

Accordingly, the electro-mechanical brake system according to one embodiment of the present disclosure may minimize side effects such as a temperature rise of the brake pad 120 or the disc 130, occurrence of a drag phenomenon, and the like caused by a distance between the disc and the brake pad, which is shortened under the active brake condition.

Figure 5:
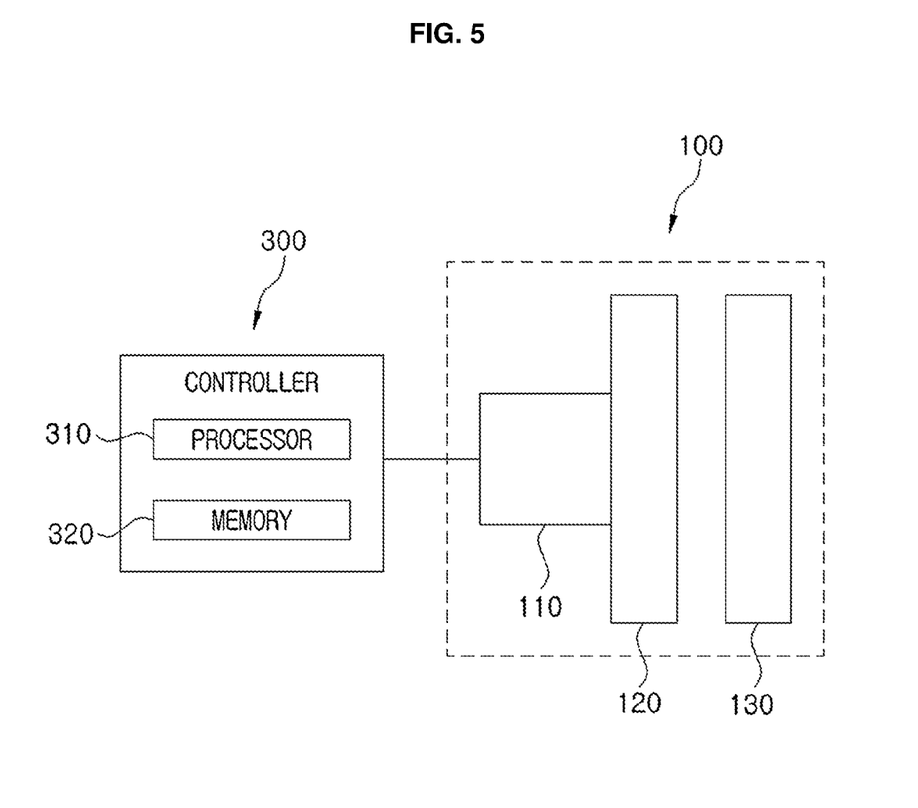
FIG. 5 is a schematic diagram of an electro-mechanical brake system according to another embodiment of the present disclosure.

Meanwhile, FIG. 5 is a schematic diagram of an electro-mechanical brake system according to another embodiment of the present disclosure.

Referring to FIGS. 2 and 5, the electro-mechanical brake system according to another embodiment of the present disclosure may include the driving part 100 and the sensor part 200 that are the same as or similar to the above-described embodiment, and the controller 300 estimates and updates the contact point P between the disc 130 and the brake pad 120 whenever a braking input or release of the braking input occurs, moves the brake pad 120 by the preset first stroke X from the disc 130 based on the contact point P when power is applied to the motor 110 or the braking input is released, and moves the brake pad 120 by the preset second stroke Y from the disc 130 based on the contact point P when the active brake condition of the vehicle occurs.

Herein, like in the above-described embodiment, a time when a force starts to increase according to a stroke of the motor 110 by the braking input or a time when the force becomes zero according to the stroke of the motor 110 by the release of the braking input may be estimated as the contact point P.

In addition, the first stroke X is set to a shortest distance in which a drag phenomenon between the brake pad 120 and the disc 130 does not occur, and the second stroke Y is set to a shorter distance than the first stroke X from the contact point P.

In addition, when the braking input is released, the controller 300 moves the brake pad 120, which has been moved by the second stroke Y from the disc 130 based on the contact point P, by the first stroke X based on the contact point P. In addition, when there is no braking input for a preset time, the controller 300 moves the brake pad 120, which has been moved by the second stroke Y from the disc 130 based on the contact point P, by the first stroke X based on the contact point P.

Herein, the stroke of the motor 110 may be defined as a travel distance of the brake pad 120 according to driving of the motor 110, and the braking input and the release of the braking input may be provided by a driver's operation of a brake pedal.

Figure 6:
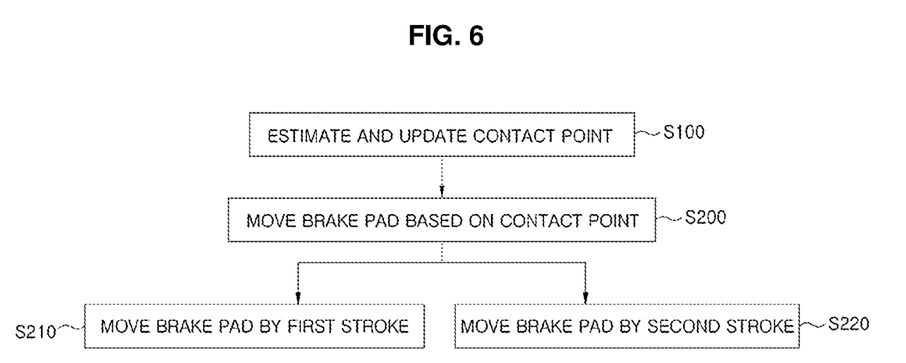
FIG. 6 is a flowchart illustrating a sequence of a controlling method of the electro-mechanical brake system according to one embodiment of the present disclosure.

Meanwhile, FIG. 6 is a flowchart illustrating a sequence of a controlling method of the electro-mechanical brake system according to one embodiment of the present disclosure.

Referring to FIGS. 1 to 6, the controlling method of the electro-mechanical brake system according to one embodiment of the present disclosure, which includes a driving part including a motor 110 configured to generate a driving force and a brake pad 120 configured to brake a vehicle or release breaking by moving forward and backward with respect to a disc 130 by the motor 110, includes estimating and updating (100) a time when a force starts to increase according to a stroke of the motor 110 by a braking input provided by a driver's operation of the brake pedal or a time when the force becomes zero according to the stroke of the motor 110 by release of the braking input as a contact point P, and moving (200) the brake pad 120 by a preset first stroke X or a preset second stroke Y based on the contact point P.

In addition, the controlling method of the electro-mechanical brake system according to one embodiment of the present disclosure may further include setting the first stroke X and the second stroke Y, and setting a time to move the brake pad 120, which has been moved by the second stroke Y from the disc 130 based on the contact point P, by the first stroke X based on the contact point P when there is no braking input for a preset time.

In addition, the estimating and updating (100) of the contact point P is performed in real time by estimating and updating a time when the force starts to increase according to the stroke of the motor 110 or a time when the force becomes zero according to the stroke of the motor 110 by the release of the braking input as the contact point P, so the contact point P is updated each time the braking input or the release thereof.

In addition, the first stroke X is set to a shortest distance in which a drag phenomenon between the brake pad 120 and the disc 130 does not occur, and the second stroke Y is set to a shorter distance than the first stroke X from the contact point P.

More specifically, the controlling method of the electro-mechanical brake system according to one embodiment of the present disclosure includes moving the brake pad 120 by the first stroke X based on the contact point P when power is applied to the motor 110 or the braking input is released (210), and moving the brake pad 120 by the second stroke Y based on the contact point P when the active brake condition of the vehicle is detected (220).

In addition, the controlling method of the electro-mechanical brake system according to one embodiment of the present disclosure may include moving the brake pad 120, which has been moved by the second stroke Y based on the contact point P, by the first stroke X based on the contact point P when the braking input is released, the rotation of the disc 130 is stopped, there is no braking input for a preset time, or other conditions occur.

Accordingly, the controlling method of the electro-mechanical brake system according to one embodiment of the present disclosure may achieve zero drag by preventing a drag phenomenon caused by a distance between a brake pad and a disc.

In addition, the controlling method of the electro-mechanical brake system according to one embodiment of the present disclosure may not only achieve zero drag but also achieve quick brake response performance in an emergency situation such as the active braking condition or the like.

An electro-mechanical brake system according to the present embodiment and a controlling method thereof can achieve zero drag by preventing a drag phenomenon caused by a distance between a brake pad and a disc.

An electro-mechanical brake system according to the present embodiment and a controlling method thereof can prevent a drag phenomenon caused by abrasion of a brake pad and the like and response performance degradation of a brake.

An electro-mechanical brake system according to the present embodiment and a controlling method thereof can prevent response performance degradation of a brake through adjustment of a distance between a disc and a brake pad when an active brake condition occurs.

An electro-mechanical brake system according to the present embodiment and a controlling method thereof can prevent side effects such as a temperature rise of a disc, occurrence of a drag phenomenon, reduction in the life of a brake pad, and the like caused by a distance between the disc and the brake pad, which is adjusted when an active brake condition occurs.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electro-mechanical brake system comprising:
    a driving part including a motor configured to generate a driving force and a brake pad configured to brake a vehicle or release braking by moving forward and backward with respect to a disc by the motor;
    a sensor part including a first sensor configured to output a signal corresponding to a stroke of the motor, a second sensor configured to output a signal corresponding to a force applied from the disc to the brake pad, and a third sensor configured to output a signal corresponding to an active brake condition of the vehicle; and
    a controller configured to estimate and update a contact point between the disc and the brake pad, whenever a braking input of the brake pad or release thereof occurs, based on the signal received from the sensor part,
    wherein the controller adjusts a distance between the disc and the brake pad based on the estimated and updated contact point.

2. The electro-mechanical brake system of claim 1, wherein the controller estimates a time when the force starts to increase according to the stroke of the motor by the braking input or a time when the force becomes zero according to the stroke of the motor by the release of the braking input as the contact point.

3. The electro-mechanical brake system of claim 1, wherein the controller moves the brake pad by a preset first stroke based on the contact point when power is applied to the motor or the braking input is released, and the first stroke is set to a shortest distance in which a drag phenomenon between the brake pad and the disc does not occur.

4. The electro-mechanical brake system of claim 3, wherein the controller moves the brake pad by a preset second stroke based on the contact point when the active brake condition of the vehicle occurs, and the second stroke is set to a shorter distance than the first stroke from the contact point.

5. The electro-mechanical brake system of claim 4, wherein the controller moves the brake pad by the first stroke when the braking input is released in a state in which the brake pad has been moved by the second stroke.

6. The electro-mechanical brake system of claim 4, wherein the controller moves the brake pad by the first stroke when there is no braking input for a preset time in a state in which the brake pad has been moved by the second stroke.

7. The electro-mechanical brake system of claim 1, wherein the stroke of the motor is defined as a travel distance of the brake pad according to driving of the motor.

8. The electro-mechanical brake system of claim 1, wherein the braking input and the release of the braking input are provided by a driver's operation of a brake pedal.

9. An electro-mechanical brake system comprising:
a driving part including a motor configured to generate a driving force and a brake pad configured to brake a vehicle or release braking by moving forward and backward with respect to a disc by the motor; and
a controller configured to adjust a distance between the disc and the brake pad through driving of the motor,
wherein the controller estimates and updates a contact point between the disc and the brake pad whenever a braking input or release thereof occurs, moves the brake pad by a preset first stroke from the disc based on the contact point when power is applied to the motor or the braking input is released, and moves the brake pad by a preset second stroke from the disc based on the contact point when an active brake condition of the vehicle occurs.

10. The electro-mechanical brake system of claim 9, wherein the controller estimates a time when a force starts to increase according to a stroke of the motor by the braking input or a time when the force becomes zero according to the stroke of the motor by the release of the braking input as the contact point.

11. The electro-mechanical brake system of claim 9, wherein the first stroke is set to a shortest distance in which a drag phenomenon between the brake pad and the disc does not occur.

12. The electro-mechanical brake system of claim 11, wherein the second stroke is set to a shorter distance than the first stroke from the contact point.

13. The electro-mechanical brake system of claim 9, wherein the controller moves the brake pad, which has been moved by the second stroke from the disc based on the contact point, by the first stroke based on the contact point when the braking input is released.

14. The electro-mechanical brake system of claim 9, wherein the controller moves the brake pad, which has been moved by the second stroke from the disc based on the contact point, by the first stroke based on the contact point when there is no braking input for a preset time.

15. The electro-mechanical brake system of claim 9, wherein a stroke of the motor is defined as a travel distance of the brake pad according to driving of the motor.

16. The electro-mechanical brake system of claim 9, wherein the braking input and the release of the braking input are provided by a driver's operation of a brake pedal.

17. A controlling method of an electro-mechanical brake system including a driving part provided with a motor configured to generate a driving force and a brake pad configured to brake a vehicle or release braking by moving forward and backward with respect to a disc by the motor, the method comprising:
estimating and updating a time when a force starts to increase according to a stroke of the motor by a braking input or a time when the force becomes zero according to the stroke of the motor by release of the braking input as a contact point; and
moving the brake pad by a preset first stroke or a preset second stroke based on the contact point.

18. The method of claim 17, wherein the first stroke is set to a shortest distance in which a drag phenomenon between the brake pad and the disc does not occur, and
the second stroke is set to a shorter distance than the first stroke from the contact point.

19. The method of claim 17, wherein the moving of the brake pad by the preset first stroke or the preset second stroke based on the contact point comprises:
moving the brake pad by the first stroke based on the contact point when power is applied to the motor or the braking input is released; and
moving the brake pad by the second stroke based on the contact point when an active brake condition of the vehicle is detected.

20. The method of claim 19, further comprising moving the brake pad, which has been moved by the second stroke based on the contact point, by the first stroke based on the contact point when the braking input is released or there is no braking input for a preset time.

* * * * *